United States Patent [19]

Rosenbaum et al.

[11] Patent Number: 5,523,328

[45] Date of Patent: Jun. 4, 1996

[54] PROCESS AND APPARATUS FOR EXTRUDING MIXTURES OF THERMOPLASTIC AND THERMOSET MATERIALS AND PRODUCTS MADE THEREFROM

[75] Inventors: James E. Rosenbaum, Denton; Frank R. Keith, Gainesville, both of Tex.

[73] Assignee: Renewed Materials Industries, Inc., Austin, Tex.

[21] Appl. No.: 243,842

[22] Filed: May 16, 1994

Related U.S. Application Data

[60] Division of Ser. No. 873,410, Apr. 24, 1992, Pat. No. 5,312,573, which is a continuation-in-part of Ser. No. 740,376, Aug. 1, 1991, abandoned.

[51] Int. Cl.$^6$ .............................. C08J 11/04; C08L 17/00; B29C 47/00

[52] U.S. Cl. .......................... 521/41; 521/42; 521/44.5; 524/507; 524/525; 525/232; 525/235; 525/130; 264/37; 264/115

[58] Field of Search .............................. 521/41, 42, 44.5; 264/115, 37, DIG. 69, DIG. 74; 152/564; 524/507, 525; 525/232, 235, 130

[56] References Cited

U.S. PATENT DOCUMENTS

| | | | |
|---|---|---|---|
| 3,027,599 | 4/1962 | Pluhacek et al. | 264/DIG. 69 |
| 3,210,301 | 10/1965 | White | 521/44.5 |
| 3,267,187 | 8/1966 | Slosberg et al. | 264/122 |
| 4,003,408 | 1/1977 | Turner | 138/118 |
| 4,028,288 | 6/1977 | Turner | 521/140 |
| 4,125,578 | 11/1978 | Sear | 264/DIG. 69 |
| 4,153,589 | 5/1979 | Triolo | 524/62 |
| 4,178,337 | 12/1979 | Hall et al. | 264/28 |
| 4,237,082 | 12/1980 | Laspisa et al. | 264/148 |
| 4,320,082 | 3/1982 | Houle | 264/257 |
| 4,356,286 | 10/1982 | Bethea et al. | 525/183 |
| 4,423,181 | 12/1983 | Kent | 525/232 |
| 4,481,335 | 11/1984 | Stark, Jr. | 264/37 |
| 4,558,096 | 12/1985 | Boon et al. | 525/171 |
| 4,758,398 | 7/1988 | Sparapany et al. | 264/151 |
| 4,795,603 | 1/1989 | Nagayasu | 264/328.18 |
| 4,968,463 | 11/1990 | Levasseur | 264/DIG. 69 |
| 4,970,043 | 11/1990 | Doan et al. | 264/237 |

(List continued on next page.)

FOREIGN PATENT DOCUMENTS

| | | | |
|---|---|---|---|
| 0401885A1 | 12/1990 | European Pat. Off. | B09B 3/00 |
| 2427070 | 10/1975 | Germany | 264/DIG. 69 |
| 144885 | 11/1980 | Germany | 264/37 |
| 0135625 | 10/1980 | Japan | 264/37 |
| 0000381 | 1/1983 | Japan | 264/37 |

OTHER PUBLICATIONS

Plastics Engineering, Apr. 1990, vol. 46, No. 4, pp. 51–53, "An Alternative To Landfills For Mixed Plastic Waste" John Maczko.

Plastics Engineering, Jun. 1988, vol. 44, No. 6, pp. 39–41, "Extrusion System Recycles Contaminated Plastic Waste", John Maczko.

Kunststoffe., vol. 83, No. 8, Munchen DE, pp. 610–612, J. Wolters, "Werkstoffmesse Fur Recycling", p. 611, Middle col., Line 10, Right col., Line 31.

Polymer Engineering And Science, "The Use Of Cryogenically Ground Rubber Tires As A Filler In Polyolefin Blends" (Abstract) K. Oliphant And W. E. Baker.

*Primary Examiner*—Paul R. Michl
*Assistant Examiner*—Olga Asinovsky
*Attorney, Agent, or Firm*—J. Mark Gilbreth

[57] ABSTRACT

Disclosed as one embodiment is a method of producing useful articles from ground whole tire waste, which includes the steps of continuously extruding a heated mixture of ground whole tire waste and thermoplastic binder material into a continuously cooled, open-ended casting chamber. The apparatus for practicing this embodiment includes an extruder, a transition nozzle having an outlet with a cross-section corresponding to the desired cross-section of the useful article, and a casting chamber being constructed and arranged to remove thermal energy from an inner surface of the casting chamber.

20 Claims, 2 Drawing Sheets

U.S. PATENT DOCUMENTS

| | | | |
|---|---|---|---|
| 5,010,122 | 4/1991 | Koski | 525/101 |
| 5,075,057 | 12/1991 | Hoedl | 264/115 |
| 5,114,648 | 5/1992 | Kuc, Sr. | 264/DIG. 69 |
| 5,157,082 | 10/1992 | Johnson | 525/237 |
| 5,254,405 | 10/1993 | Panaroni et al. | 525/130 |
| 5,312,573 | 5/1994 | Rosenbaum et al. | 264/37 |
| 5,385,953 | 1/1995 | McClellan | 525/130 |

FIG. 1

PROCESS AND APPARATUS FOR EXTRUDING MIXTURES OF THERMOPLASTIC AND THERMOSET MATERIALS AND PRODUCTS MADE THEREFROM

This is a division of application Ser. No. 873,410, filed Apr. 24, 1992, now U.S. Pat. No. 5,312,573, which is a continuation-in-part of application Ser. No. 740,376, filed Aug. 1, 1991, now abandoned.

BACKGROUND OF THE INVENTION

1. Field of the Invention

The present invention relates to a process and apparatus for extruding mixtures of thermoplastic and thermoset polymers and to articles made therefrom. More particularly, the present invention relates to a process and apparatus for extruding mixtures of thermoplastic and thermoset polymers and to articles made therefrom, wherein at least one of the polymers is recycled. Still more particularly, the present invention relates to a process and apparatus for extruding mixtures of polyolefins and recycled rubber and to articles made therefrom. Still yet more particularly, the present invention relates to a process and apparatus for extruding mixtures of polyethylene and tire particles and to articles made therefrom.

2. Description of the Related Art

Plastic materials are finding utility in more and more applications everyday. For example, plastics are used in all sorts of disposable applications such as diapers, product packaging, utensils, plates, cups, syringes, drink containers and shrink wrap. As another example, plastics are used as a major material of construction for electronic products such as telephones, computers, radios, stereos, kitchen appliances. As further example, plastics are utilized in automobiles in such applications as body molding, bumper guards, hoses, light covers, interior paneling, mud guards, floor mats and tires. In the construction industry, plastics are utilized in electrical wire, telephone wire, as paneling, horizontal surface tops, switches and moldings. Other examples, include the use of plastics in articles of clothing.

Unfortunately, as plastic materials proliferate into every facet of life, such materials become a larger portion of the waste stream. Disposable plastic items are used then disposed. Goods comprising plastic are trashed once the end of the useful life of the good is reached. Plastic waste is even generated during the process of making plastic articles in the form of off-spec material or "flash". Off-spec material may be rejected because of appearance or physical property deficiency. "Flash" refers to excess polymer on a formed article that must be removed from the formed article. The environmental pressures of today stress recycling these waste plastic materials whenever possible.

Plastics fall into one of two categories, thermoplastics and thermosets.

Thermoplastics are polymers that will have a softening temperature and a melting temperature. Examples of thermoplastics include polyvinyl chloride, nylon, polyurethane and polyolefins. Heating a thermoplastic above its softening temperature will soften it, and heating it above its melting temperature will melt it. It is easy to see that thermoplastics can be formed into a shape, melted and reformed. Thus thermoplastics lend themselves to recycling.

Thermosets, on the other hand, do not readily lend themselves to recycling. A thermoset is a polymer that solidifies or "sets" irreversibly. Examples of thermosets include, phenolics, polyesters, rubber and synthetic rubber. Since these polymers irreversibly set, heating them does not melt them into a reformable liquid. Thermosets are thus difficult to recycle.

As old vehicle tires are generally considered to constitute an environmental eyesore, many efforts have been made to recycle tires.

U.S. Pat. No. 3,210,301, issued Oct. 5, 1965, to White discloses a rubber compounding product that is made by recycling vulcanized reclaimed rubber from tires by first removing fibers and then mechanically working the rubber in the presence of 0.1–35 parts atactic polypropylene per hundred parts rubber.

Several patents disclose the use of rubber in making a molding composition. For example, U.S. Pat. No. 3,267,187, issued Aug. 6, 1966 to Slosberg et al., discloses that rubber granules may be mixed with a thermoplastic resin and molded into sheets. Also, U.S. Pat. No. 4,320,082, issued Mar. 16, 1982 to Houle, discloses a molding composition made from rubber, nylon and a vulcanizing agent, such as sulfur or magnesium oxide. U.S. Pat. No. 4,481,335, issued Nov. 6, 1984, discloses a rubber molding composition comprising tire rubber scrap, a sulfur curable polymeric binder and a curing agent for the binder. Finally, U.S. Pat. No. 4,795,603, issued Jan. 3, 1989 to Nagayasu, discloses an injection molding composition comprising 10–30 percent rubber particles and 70–90 percent polyethylene or polypropylene waste. However, these compositions are generally for batch type molding processes rather than a continuous extrusion type process.

U.S. Pat. No. 4,028,288, issued Jun. 7, 1977, and U.S Pat. No. 4,003,408, issued Jan. 18, 1977, both to Turner, both disclose processes for reclaiming tire rubber utilizing particalized tires, but excluding the metallic content thereof. Turner '288 limites the amount of cord content to less than 10 percent. Thus neither Turner patent discloses a method for processing the whole tire.

Finally, U.S. Pat. No. 4,970,043, issued Nov. 13, 1990, discloses a method of recycling "high grade" rubber having reduced debris as compared to reground rubber obtained from many automobile tires. The high grade rubber is extruded with a thermoplastic to form a semi-stable moldable product which is then cooled to form a stable moldable product. Since this process requires "high grade" rubber, tires containing debris cannot be processed.

While many attempts have been made to reuse old tires, these attempts have not been successful in producing products in processes which reuse whole tire waste, including metal and fabric belts and tire beads, or in producing products for which a sufficient need exists to utilize all of the available tire waste.

SUMMARY OF THE INVENTION

According to one embodiment, the present invention provides a process for producing useful articles from ground whole tire waste and apparatus for accomplishing the process. The process includes continuously extruding a heated mixture of ground whole tire waste and thermoplastic binder material into the interior of an elongated open-ended casting chamber. The casting chamber has a cross-section corresponding substantially to the cross-section of the desired useful article. The exterior surface of the casting chamber is continuously cooled to remove a sufficient amount of thermal energy from the casting chamber such that a dimensionally stable extrudate emerge from its open end. The emerging extrudate is then cut to length.

According to another embodiment of the present invention, the apparatus for accomplishing the above described process includes an extruder for extruding a mixture of ground whole tire waste and thermoplastic binder material from an outlet of the extruder. An end nozzle is attached to the extruder outlet. The end nozzle has a frustroconical inner surface converging in the direction of extrusion. A transition nozzle is attached to the end nozzle. The transition nozzle has an inner surface that transforms from an inlet having circular cross-sections to an outlet having rectangular cross-sections. A casting chamber having an inlet attached to the outlet of the transition nozzle terminates at an open-ended outlet. The casting chamber has a uniform inner surface with substantially the same cross-section as the transition nozzle outlet. The casting chamber is constructed and arranged to receive coolant about an exterior surface to remove thermal energy conducted from the inner surface.

According to yet another embodiment of the present invention, there is provided a process for making an extruded article by first forming a mixture comprising in the range of about 5–95 weight percent thermoplastic, in the range of about 0–20 weight percent reinforcing material and in the range of about 5–95 weight percent thermoset particles, all based on the total weight of the mixture. The next step is heating the mixture to a temperature at least the melting point of the thermoplastic and less than the degradation temperatures of both the thermoplastic and thermoset. Then, extrude the mixture through a die having a cross-sectional shape desired of the end product at sufficient conditions so that the final product will have a shore A hardness of at least about 70. Finally, the extrudate is cooled into the final product.

According to still yet another embodiment of the present invention, there is provided an extruded article comprising in the range of about 5–85 weight percent thermoplastic, in the range of about 0–20 weight percent reinforcing material and in the range of about 15–95 weight percent thermoset, all based on the total weight of the components, and having a shore A hardness of at least 70.

According to even still yet another embodiment of the present invention, there is provided an apparatus for producing useful articles of a desired cross-sectional shape, from a mixture of thermoset and thermoplastics materials, the apparatus comprising an extruder for extruding an extrudate comprising the mixture through an extruder outlet and a forming nozzle attached to and adapted to receive extrudate from the extruder outlet, wherein the nozzle comprises a nozzle outlet adapted to form the extrudate into a cross-sectional shape substantially equal to the desired cross-sectional shape of the useful article to be produced, and wherein the nozzle further comprises at some point prior to the nozzle outlet an expansion section having an inner cross-sectional shape that is greater than the desired cross-sectional shape of the useful article to be produced. The apparatus further comprises a cooling chamber attached to, adapted to receive extrudate from, and having substantially the same cross-sectional shape as the nozzle outlet, and further adapted to sufficiently cool extrudate into a stable article of the desired cross-sectional shape. For the apparatus of the present invention, the cooling chamber, the extruder and the expansion section are designed such that the produced article will have a shore A hardness of at least 70.

BRIEF DESCRIPTION OF THE DRAWINGS

A more complete understanding of the invention and its advantages will be apparent from the Detailed Description of the Invention taken in conjunction with the accompanying drawings, in which like numerals refer to like and corresponding elements, and in which.

DETAILED DESCRIPTION OF THE INVENTION

In accordance with the present invention, thermoplastic and thermoset materials are mixed together, heated to melt the thermoplastic, then extruded into the desired shape through a die and then cooled.

Thermoset materials useful in the present invention include any thermoset that when processed according to the present invention will yield a product having the desired properties. Mixtures of thermosets may be used. Generally, the thermoset utilized in the present invention includes at least one selected from the group consisting of rubber, phenolics, alkyds, amino resins, polyesters, epoxides and silicones. Preferably, the thermoset utilized in the present invention is rubber.

"Rubber" as used herein is intended to mean one or more of the following: natural rubber, polymers, interpolymers and copolymers of conjugated diolefins, i.e., polybutadiene, butadiene-styrene copolymers, butadiene-acrylonitrile copolymers, polymers and copolymers of methylpentadiene; polymeric forms of chlorine substitution products of conjugated diolefins, i.e., polychloroprene; polymers of non-conjugated systems, i.e., polyisobutylene and copolymers of isobutylene and isoprene; and condensation polymers of the polysulphide type.

The thermosets utilized in the present invention may be obtained from any source, including being produced in-situ in the process. However, it is generally economically desirable that the thermosets utilized in the present invention be obtained as scrap or waste material.

When rubber is utilized as the thermoset material, it is generally desirable that scrap or waste rubber from tires be utilized. In the process of the present invention it is not critical that high grade rubber be utilized. Furthermore, in the process of the present invention, it is not critical that metal or fibers in the tire be removed. Rather, as one novel feature of the present invention, the process of the present invention is capable of processing a whole tire into a useful article. Generally, tires that may be processed in the present invention include truck, aircraft, heavy machinery, motorcycle, bicycle and automobile tires. Preferably, automobile tires are utilized in the process of the present invention. Tires typically comprise about 60–70 percent rubber, 20–30 percent steel and 5–10 percent textile fibers.

In the present invention, the percentage of thermoset in the mixture to be extruded will depend upon economic, processing factors and the desired properties of the article to be produced. Generally, the mixture to be extruded will comprise in the range of about 5 to about 95 weight percent thermoset. Preferably, the mixture to be extruded will comprise in the range of about 40 to about 94 weight percent thermoset. More preferably, the mixture will comprise in the range of about 50 to about 85 weight percent thermoset, and most preferably, in the range of about 60 to about 80 weight percent thermoset.

It must be remembered that the particle size of the thermoset materials fed to the extruder will not be drastically altered in the extrusion process. The particle size of the thermoset material processed in the present invention will generally be any size that will produce a product having the desired properties. The particle size of the thermoset material will also be dependent upon the processing capabilities of the equipment. Generally, the particles of thermoset material utilized in the present invention will range in size from a fine powder to those with a diameter in the range of about 1/32nd inch to about 1/4 inches in diameter and in the range of about 1/32nd inch to about 10 inches long. Preferably, the thermoset material utilized in the present invention will be in the range of about 1/32nd inch to about 1/8th inch in diameter and in the range of about 1/16th inch to about 3 inches long. The shape of the particle is not critical in the practice of the invention, but will be any shape that will provide the desired end properties in the formed object. Generally the shape will range from irregular, spherical to elongated and will be dependent upon the size reduction method utilized.

Large thermoset pieces may be reduced to smaller pieces utilizing techniques well known to those of skill in the art. Such techniques include milling, crushing, grinding, shredding, and cryogenic breaking processes in which the material is cooled in liquid nitrogen or the like and pulverized.

Thermoplastic materials useful in the present invention include any thermoplastic that when processed according to the present invention will yield a product having the desired properties. Mixtures of thermoplastics may be used. Generally, the thermoplastic utilized in the present invention includes at least one selected from the group consisting of polyolefins, polyvinyl chloride, nylons, fluorocarbons, polyurethane prepolymer, polystyrene, high impact strength polystyrene, cellulosic resins, acrylic resins, polyphenylene oxide and polyphenylene sulfide. Preferably, the thermoplastic utilized in the present invention includes at least one selected from the group consisting of polyolefins, and high impact strength polystyrenes. "Polyolefins" refers to polymers derived from simple olefins. The polyolefins may be homopolymers of C2–C20 alpha-olefins and may also be copolymerized with at least one selected from C2–C20 alpha-olefins and C3–C20 polyenes. Preferable polyolefins include ethylene and propylene which refer not only to the homopolymer, but also to polymers having 2 or more monomers in which at least one of the monomers is ethylene or propylene. Most preferably, the thermoplastic utilized in the present invention includes at least one selected from the group consisting of polyethylene, polypropylene, and high impact strength polystyrenes.

The thermoplastic materials utilized in the present invention may be virgin materials, or may also be waste or scrap materials.

The particle size of the thermoplastic materials is not critical to the practice of the present invention. The thermoplastic particles will be melted and reformed in the extrusion process. Therefore the particle size is dependent upon the processing capabilities of the equipment utilized.

In the present invention, the percentage of thermoplastic in the mixture to be extruded will depend upon economic, processing factors and the desired properties of the article to be produced. Generally, the mixture to be extruded will comprise in the range of about 5 to about 95 weight percent thermoplastic. Preferably, the mixture to be extruded will comprise in the range of about 6 to about 60 weight percent thermoplastic. More preferably, the mixture will comprise in the range of about 15 to about 50 weight percent thermoplastic, and most preferably, in the range of about 20 to about 40 weight percent thermoplastic.

Some desired end products may require the incorporation of reinforcing material for added strength. In addition to any reinforcing material that is part of the thermoplastic or thermoset materials utilized, other reinforcing material may optionally be added to provide added strength to the final produced product. For example, carbon, graphite and synthetic fibers may be added to the process. It is also possible to coextrude the mixture with continuous reinforcing fibers, matting or webbing oriented in the machine direction.

In the present invention, the percentage of reinforcing material in the mixture to be extruded will depend upon economic, processing factors and the desired properties of the article to be produced. When present in the mixture to be extruded, the reinforcing material will comprise in the range of about 1 to about 30 weight percent of the mixture. Preferably, the mixture to be extruded will comprise in the range of about 2 to about 20 weight percent reinforcing material.

In the process of the present invention, additives as generally known to those of skill in the extrusion art may be utilized. Such additives include processing aids, lubricants, colorants, reinforcing fibers, stabilizers, antioxidants, fillers, conductive additives, heat stabilizers, blowing agents and plasticizers. Such additives, if utilized, will generally comprise in the range of about 0.1 to about 10 weight percent of the extruded mixture.

The above described mixture must be heated to a temperature sufficient to melt the thermoplastic components, but not so great as to degrade any of the polymers in the mixture.

The present invention may be carried out in any apparatus that will sufficiently perform the necessary process steps and produce a product with the desired properties. The apparatus of the present invention will generally comprise a mixing section for receiving and mixing the thermoplastic and thermoset materials, a heating section for heating the mixture to the thermoplastic melting temperature, an extrusion section for extruding the mixture, a transition section connecting the extrusion section and the forming section, a forming section that comprises a die with the shape of the desired object, and a cooling section. These sections may be distinct sections, or they may be combined. For example, while not preferred, the thermoplastic and thermoset materials may be mixed in the extruder hopper.

Alternatively, multiple extruders may be used to heat the various polymers utilized in the present invention. This may be economically beneficial when thermoplastics having greatly different melting temperatures are utilized. The thermoplastics may each be melted separately in different extruders and later combined together. It will also be necessary to heat the thermoset particles to the melting temperature of the thermoplastics so that when the polymers are mixed together, the thermoset particles will not cool the thermoplastics to below their melting temperature.

Referring now to FIGS. 1–6, there is illustrated one embodiment of the apparatus of present invention. Apparatus 10 is constructed and arranged to practice the process of the present invention, which is a process for producing useful articles from mixtures of thermoset and thermoplastic polymer material in an extrusion casting process.

Figure 1:
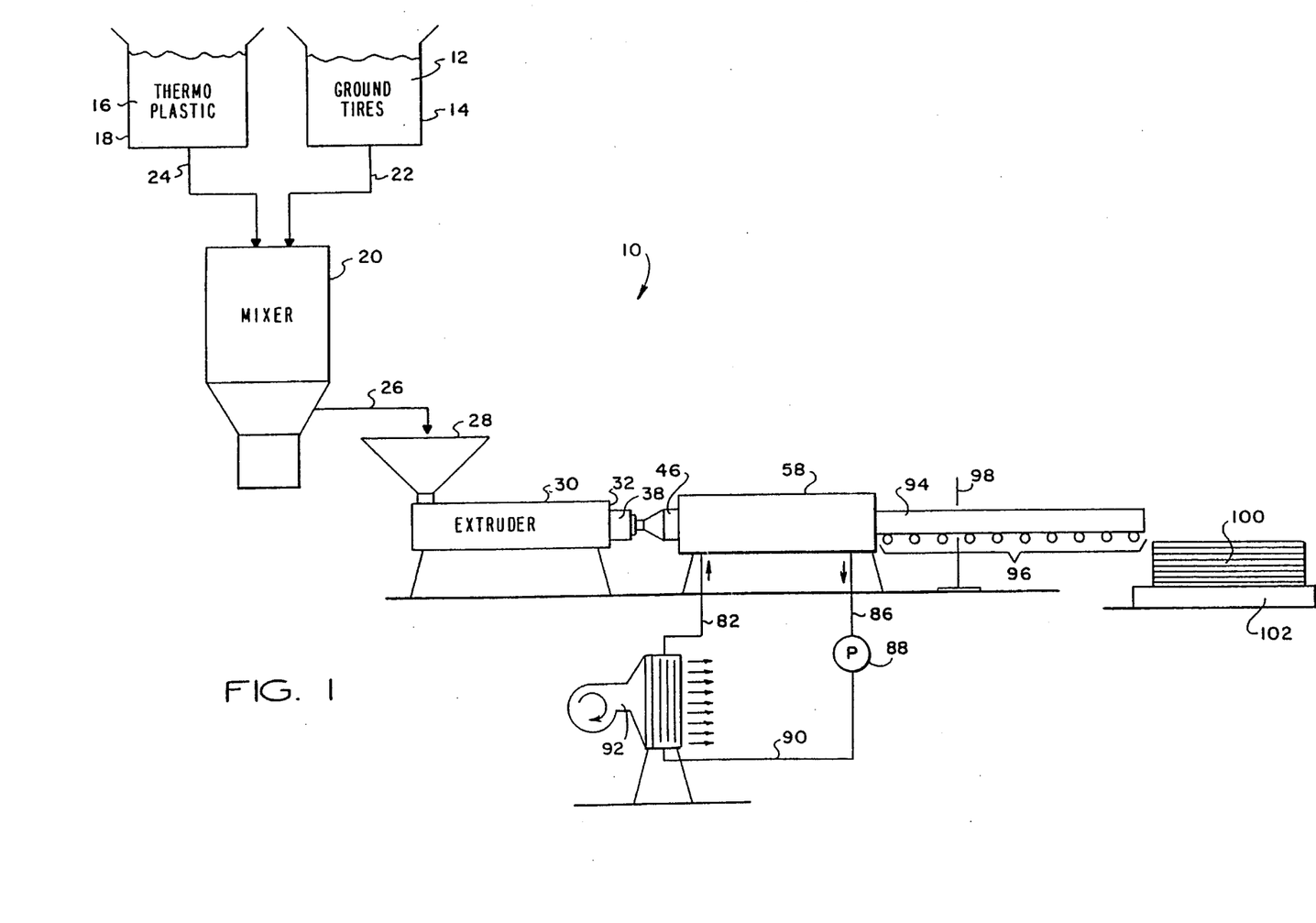
FIG. 1 is a schematic view of apparatus constructed to practice the process of the present invention.

As shown, the mixing section comprises containers 14 and 18 and mixer 20. The ground thermoset material 12 is initially delivered to the site in a container 14. Thermoplastic binder material 16 is delivered to the site in a container 18. Thermoset material 12 and thermoplastic material 16 are conveyed in a predetermined proportion to a mixer 20, as indicated by arrows 22 and 24, where the starting materials are thoroughly premixed. The premixed starting materials are then conveyed as shown by arrow 26 to the inlet hopper 28 of extruder 30.

Figure 2:
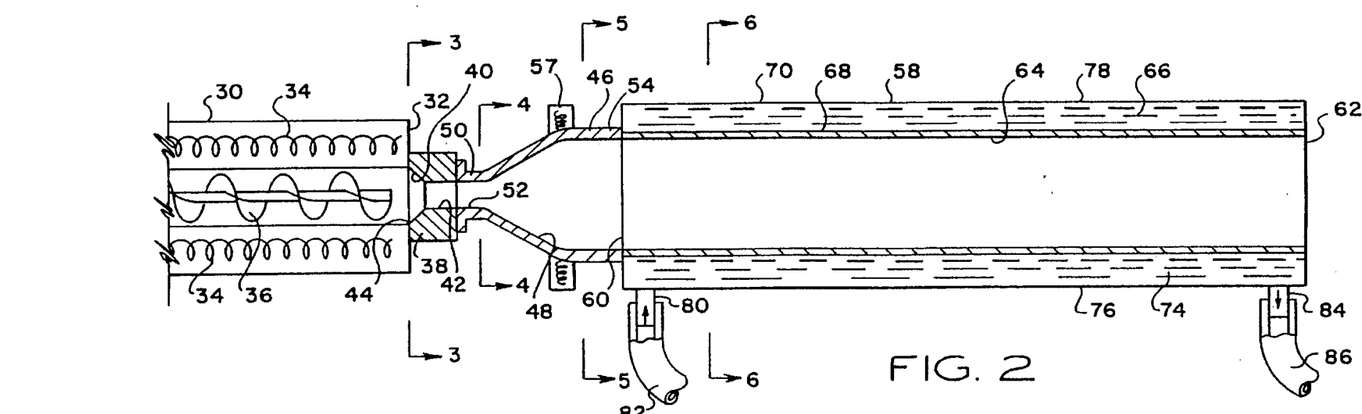
FIG. 2 is a schematic, partially broken-away, enlarged, partial, side view of the apparatus of FIG. 1.

In the embodiment shown, the heating and extrusion sections are combined in extruder 30. In conventional fashion, extruder 30 heats and conveys the starting materials to an extruder outlet 32. The heating of the extrudate may be by any suitable means, such as for example, heated gases such as steam, heated liquids or oils, electrical heating elements and combinations thereof. In the embodiment shown, the extrudate is heated by way of electrical resistance coils 34 and conveyed by way of screw 36.

In the transition section, it is necessary, that the necessary pressure for the particular materials processed be achieved to sufficiently consolidate that materials, such that the final formed end product will have the desired physical properties. For example for typically processed 50%/50% mixtures of polyethylene/tire rubber, the consolidation pressure must be in the range of about 200 psi to about 2000 psi.

This necessary consolidation pressure may be produced by a combination of several factors. The screw design, the shape of the end nozzle 38, the shape of the transition nozzle 46, and the shape of the transition outlet nozzle 54, all may effect the consolidation pressure. For example, consolidation pressure is increased by providing in the transition section, an end nozzle 38 converging in the direction of extrusion, a transition outlet nozzle 54 converging in the direction of extrusion or combinations thereof.

In addition, consolidation pressure is increased if at some point in the transition section, the cross-sectional area of the extrudate is greater than the cross-sectional area of the die through which the extrudate will pass at the end of the transition section. If the extrusion outlet cross-sectional area is greater than the die cross-sectional area, then this condition is easily provided. If the extrusion outlet cross-sectional area is smaller than the die cross-sectional area, then at some point in the transition section, there must be an enlarged section to provide this condition.

In the embodiment shown, the consolidation pressure is obtained utilizing the proper screw design and end nozzle 38 converging in the direction of extrusion. The transition section consists of end nozzle 38 and transition nozzle 46. As shown, end nozzle 38 is tapered in such a manner as to increase the consolidation pressure in transition nozzle 46.

Figure 3:
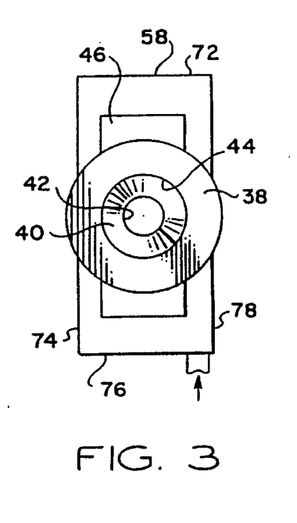
FIG. 3 is a sectional view taken along lines 3—3 of FIG. 2.

End nozzle 38 is attached to extruder outlet 32. As best shown in FIGS. 2 and 3, end nozzle 38 has a frustroconical inner surface 40 converging in the direction of extrusion. Frustroconical inner surface 40 is joined to a cylindrical inner surface 42 having a cross-sectional diameter smaller in dimension than the inlet cross-sectional diameter 44 of frustroconical inner surface 40.

Figure 4:
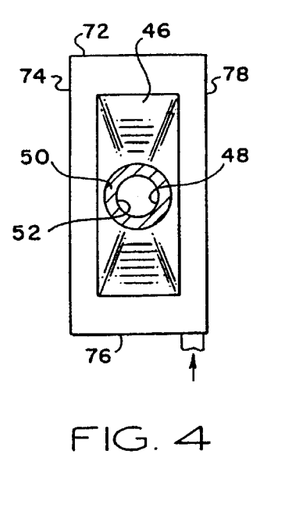
FIG. 4 is the sectional view taken along lines 4—4 of FIG. 2.
Figure 5:
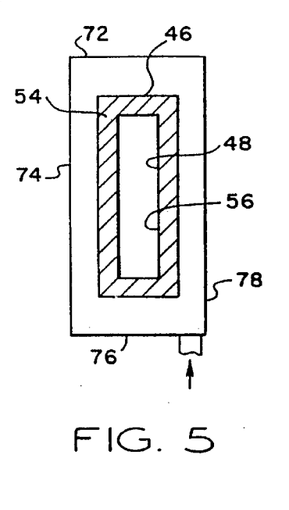
FIG. 5 is a sectional view taken along lines 5—5 of FIG. 2.

Transition nozzle 46 is attached to end nozzle 38. Transition nozzle 46 has an inner surface 48 that transforms from an inlet 50 having a cylindrical inner surface 52 with circular cross-sections, as best shown in FIG. 4. Inner surface 52 transforms to an outlet 54 having an inner surface 56. Inner surface 56 has rectangular cross-sections, as best shown in FIG. 5. Heat may be supplied to transition nozzle 46 by way of an electric resistance heating element 57.

In a preferred embodiment (not shown) to the transition section, the transition section will comprise a transition outlet nozzle 54 tapered in the direction of extrusion and at least one portion of the transition nozzle 46 will have a cross-sectional area greater than the cross-sectional area of inner surface 56 at the outlet of transition nozzle 46. End nozzle 38 may optionally eliminated if sufficient consolidation pressure is obtained to produce end products having the desired physical properties.

Transition nozzle outlet 54 is attached to cooling chamber 58. Methods of cooling an extrudate that has passed through a die are well known and this invention is not limited to any one method.

Figure 6:
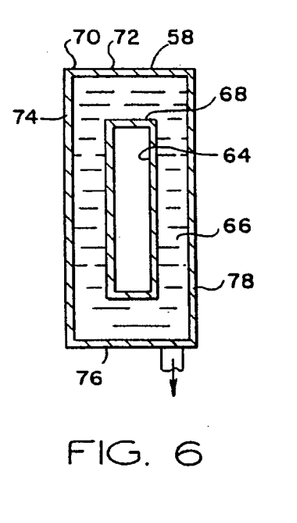
FIG. 6 is a sectional view taken along lines 6—6 of FIG. 2.

In the embodiment shown, cooling chamber 58 has an inlet 60 attached to outlet 54 of transition nozzle 46 and an outlet 52 that is open-ended. Cooling chamber 58 has a uniform inner surface 64 with substantially the same cross-section as surface 56 of the transition nozzle outlet 54. Cooling chamber 58 is constructed and arranged to receive coolant 66 about an exterior surface 68 to remove thermal energy conducted form inner surface 64. Exterior surface 68 is contained within a coolant jacket 70 formed by jacket walls 72, 74, 76, 78.

Coolant 66 is supplied to coolant jacket 70 by way of an inlet 80 through hose 82. Coolant exits jacket 70 through outlet 84 and hose 86. As best shown in FIG. 1, coolant 66 is circulated by way of a pump 88, which conveys coolant through hose 90 to a heat exchanger 92 before returning it to jacket 70 by way of hose 82.

The amount of thermal energy to be removed by circulating coolant 66 can be determined by routine experimentation, and is a factor of the volume of jacket 70, the area of surface 68, the length of casting chamber 58, circulation rate established by pump 88, and heat exchange capability of heat exchanger 92. Cooling chamber 58 may be provided in sections, such that its total length is adjustable. Some sections may be liquid cooled while other sections are air cooled. The cooling system must be sufficient to reduce the skin temperature of the extrudate at the open end of cooling chamber 58 such that the extrudate is dimensionally stable during further cooling.

As best shown in FIG. 1, an emerging extrudate 94 is supported by a conveyor 96, and cut to length by way of a shear 98 to produce useful articles 100. 3Useful articles 100 may be stacked on a pallet 102 to enable further handling.

In the operation of this embodiment, a pre-mixed mixture of ground thermoset waste 12 and thermoplastic binder material 16 is continuously extruded by way of extruder 30 into the interior of cooling chamber 58. Typical temperatures for processing some polyethylene/tire rubber mixtures are in the range of about 350° F. to about 525° F. at outlet 32. Cooling chamber 58 has a cross-section defined by surface 64 that corresponds substantially to the cross-section of the desired useful articles 100. Exterior surface 68 of casting chamber 58 is continuously cooled by way of coolant 66 circulated through exchanger 92. Sufficient thermal energy is removed from casting chamber 58 such that extrudate 94 is dimensionally stable as it emerges from the open end 62 of the casting chamber. The emerging extrudate 94 is cut to length by shear 98.

As can be seen, useful articles 100 are members having a rectangular cross-section and cut to predetermined lengths. Useful articles 100 are ideal for use as building material, and may be formed having cross-sections corresponding to conventional dimensional lumber, such as 2×4's, 2×6's, 4×4's, etc. The useful articles have a strength and fastener holding ability similar to or exceeding that of wood lumber, and are virtually indestructible. The articles can be sized from 1×1 (0.75"×0.75") square cross-section all the way to large diameter, round utility poles. It is expected that the useful articles will greatly out perform lumber in environmental conditions involving moisture, sunlight and extreme temperatures. Obviously, the use of one hundred percent waste material to produce a product which substitutes for lumber has substantial ecological benefit.

Material 12, the ground whole tire waste, is available from waste tire processors without any rubber, fabric or metal material removed. A key advantage of this invention is that the whole tire waste can be utilized, as opposed to many prior art attempts to utilize tire waste which require use of a "high grade" rubber, substantially free of foreign fabric and metal debris. At present, ground whole tire waste is available from tire processors essentially free of charge.

The thermoplastic binder material 16 acts as a kind of "glue" to bind the ground whole tire waste 12 together in the extrudate 94.

Interior surface 64 of casting chamber 58 may be polished or coated with a fluoro polymer mold-release agent in order to affect the surface roughness of the articles. The extrudate may experience some shrinkage in dimension, so the cross-sectional of casting chamber 58 must be sized accordingly. Electric resistance heating element 57 may be required depending on the amount of transition in order to keep the extrudate in a plastic form until it begins to cool and harden in casting chamber 58.

The ratio of tire waste to thermoplastic binder material establishes the characteristics of the end product. A mixture comprising six percent or less thermoplastic material by weight is very rubbery, has reduced strength and requires a relatively slow process rate due to a longer bonding time. A product produced with 60 percent or higher thermoplastic is very dense and resilient, but experiences undesirable changes in resilience with temperature. In extreme cold temperatures, the product becomes breakable.

The product of the present invention will generally have a tensile strength, as measured by ASTM D412, of at least 850 psi. Preferably, the product of the present invention will have a tensile strength of at least 1000 psi, and most preferably a tensile strength of at least 1500 psi.

The product of the present invention will generally have an elongation in the range between about 0 to about 300 percent. Preferably, the elongation will be in the range of about 5 to about 100 percent. Most preferably, in the range of about 5 to about 40 percent.

The product of the present invention generally will have a shore A hardness greater than about 70. Preferably, the product of the present invention will have a shore A hardness greater than about 80. More preferably, the product of the present invention will have a shore A hardness greater than about 90, and most preferably greater than about 100.

The product of the present invention will generally have a screw retention, as measured by ASTM E588, of at least 300 lbs. Preferably, the product of the present invention will have a screw retention of at least 450 lbs., and most preferably at least 600 lbs.

The specific gravity of the product of the present invention will generally depend upon the thermoset and thermoplastic materials utilized and the operating conditions. Generally, the specific gravity of the product of the present invention will be at least about 0.8. Preferably, the specific gravity will be in the range of about 0.9 to about 1.1.

The following examples are provided by way of further illustration rather than limitation.

EXAMPLES

Example 1

An apparatus substantially as shown in FIGS. 1–6 was employed to produce useful articles 100 having a cross-section corresponding to a conventional 2×8 lumber board (1.5" by 7.25"). Ground whole tire waste and waste polyethylene were used in the starting mixture. The plastic binder material comprised 12–15 percent by weight. The exit temperature of the extrudate was between 355° F. and 400° F. Casting chamber 58 was five feet in length, with coolant 66 being supplied by a hose connected to a tap water faucet and directed against one of the wide (7.25") exterior surfaces. No enclosed jacket 70 was employed.

Extruder 30 was a conventional device having a 4.5" screw turning at 15 RPM. The screw had a ratio of 24:1, and thus had a length of 108".

The extrudate surface was relatively smooth on the side that received the direct stream of coolant, while the other three sides were relatively rough A smooth or rough surface texture may thus be established by the cooling efficiency and consistency. An approximately 1" water jacket 70 around the extrudate will provide a smooth surface, with sufficient coolant circulation and heat exchange capability. By contrast, if the first three to five feet of casting chamber 58 are only air-cooled, then a consistently rough surface may be obtained.

End nozzle 38 had an inlet diameter 44 of 4.5" that converged to a cylindrical surface 42 having a diameter of 3". The frustroconical surface provides sufficient back pressure in the extruder. No screen was used at the outlet of the extruder. The thermoplastic binder material 16 was ground into pellets being English pea size or smaller. The particles in the ground whole tore waste were similarly sized.

Example 2

A 4×4 (3.5"×3.5") article was produced using apparatus similar to that just described. The outlet temperature was approximately 600° F., and the starting mixture comprised 12–15 percent thermoplastic binder material and 65–68 percent ground tire waste, by weight. The extruder was turned at a rate of 2 RPM.

Example 3

An apparatus substantially as shown in FIGS. 1–6 was employed to produce useful articles 100 having a cross section corresponding to a conventional 2×8 lumber board (1.5" by 7.25"). Ground whole tire waste and waste polyethylene were used in the starting mixture. The plastic binder material comprised 35–38 percent by weight, with the balance comprising whole ground tire waste. The exit temperature of the extrudate was between 375° F. and 400° F. Casting chamber 48 was 14 inches in length, with coolant 66 being supplied by a refrigeration unit and pump which forced coolant in and out of the jacket of the chill section or sizing die.

Extruder 30 was a conventional device having a 4.5" screw turning at 15 RPM. The screw had a ratio of 24:1 and, thus had a length of 108".

End nozzle 38 had an inlet diameter 44 of 4.5" that converged to a cylindrical surface 42 having a diameter of 3". The frustroconical surface provides sufficient back pressure in the extruder. No screen was used at the outlet of the extruder. The thermoplastic binder material 16 was ground into pellets being English pea size or smaller. The particles in the ground while tire waste were similarly sized.

The extrudate was developed with a smooth surface and well consolidated core by varying land length and cooling chamber temperature. Optimum consolidation and surface finish were obtained with a land length of 23 inches and a sizing temperature of 45°–64° F. resulting in a minimum die pressure of 200 psig. By varying die temperature and extrusion rates in a manner known by one proficient in extrusion, a quality product with minimum physical properties as shown in Table 1 may be produced.

TABLE 1

| Minimum Physical Properties of Extruded Product Containing 35-38 Percent Plastic Binder | |
|---|---|
| Specific Gravity TEX207F | 0.902 |
| Shore A Hardness | 95 |
| Screw Retention[1], ASTM E588, pounds | 500 |
| Tensile Strength, ASTM D412, psi | 897 |
| Elongation, % | 13 |
| Deflection at midpoint of 15" free span with 1510 pound load, in. | 4.5 |

[1]One quarter inch hex head cap screw with 150 pounds/minute loading rate, full screw engagement.

Whereas the present invention has been described with respect to a specific embodiment thereof, it will be understood that various changes and modifications will be suggested to one skilled in the art, and it is intended to encompass such changes and modifications as fall within the scope of the appended claims.

We claim:

1. An article comprising an extruded body wherein the extruded body comprises thermoplastic and ground tire waste, and wherein the ground tire waste comprises rubber and metal debris.

2. The article of claim 1 wherein the thermoplastic comprises at least one selected from the group consisting of polyolefins, polyvinyl chloride, nylons, fluorocarbons, polyurethane prepolymer, polystyrene, high impact strength polystyrene, cellulosic resins, acrylics resins, polyphenylene oxide and polyphenylene sulfide.

3. The article of claim 1 wherein the article has a shore A hardness of at least 70.

4. The article of claim 1 comprising in the range of about 5 to about 85 weight percent thermoplastic, in the range of about 0 to about 20 weight percent reinforcing material and in the range of about 5 to about 95 weight percent ground tire waste.

5. The article of claim 1 wherein the thermoplastic comprises at least one selected from the group consisting of polyolefins, polyvinyl chloride, nylons, fluorocarbons, polyurethane prepolymer, polystyrene, high impact strength polystyrene, cellulosic resins, acrylics resins, polyphenylene oxide and polyphenylene sulfide, wherein the article has a shore A hardness of at least 70, and wherein the article comprises in the range of about 5 to about 85 weight percent thermoplastic, in the range of about 0 to about 20 weight percent reinforcing material and in the range of about 5 to about 95 weight percent ground tire waste.

6. The article of claim 1 the thermoplastic comprises at least one selected from the group consisting of polyolefins and high impact strength polystyrenes.

7. The article of claim 1 comprising in the range of about 15 to about 50 weight percent thermoplastic, in the range of about 2 to about 20 weight percent reinforcing material and in the range of about 50 to about 85 weight percent ground tire waste.

8. The article of claim 1 wherein the article has a shore A hardness of at least 80.

9. The article of claim 1 wherein the thermoplastic comprises at least one selected from the group consisting of polyolefins and high impact strength polystyrene, wherein the article has a shore A hardness of at least 80, and wherein the article comprises in the range of about 15 to about 50 weight percent thermoplastic, in the range of about 2 to about 20 weight percent reinforcing material and in the range of about 50 to about 85 weight percent ground tire waste.

10. The article of claim 1 wherein the thermoplastic comprises polyethylene or polypropylene, wherein the article has a shore A hardness of at least 90, and wherein the article comprises in the range of about 20 to about 40 weight percent thermoplastic, in the range of about 2 to about 20 weight percent reinforcing material and in the range of about 60 to about 80 weight percent ground tire waste.

11. An article comprising an extruded body wherein the extruded body comprising thermoplastic and ground tire waste particles, wherein the ground tire waste particles comprise rubber and metal debris, and wherein the ground tire waste particles are in the range of about 1/16th inch to about 3 inches long.

12. The article of claim 11 wherein the thermoplastic comprises at least one selected from the group consisting of polyolefins, polyvinyl chloride, nylons, fluorocarbons, polyurethane prepolymer, polystyrene, high impact strength polystyrene, cellulosic resins, acrylics resins, polyphenylene oxide and polyphenylene sulfide.

13. The article of claim 11 wherein the article has a shore A hardness of at least 70.

14. The article of claim 11 comprising in the range of about 5 to about 85 weight percent thermoplastic, in the range of about 0 to about 20 weight percent reinforcing material and in the range of about 5 to about 95 weight percent ground tire waste.

15. The article of claim 11 wherein the thermoplastic comprises at least one selected from the group consisting of polyolefins, polyvinyl chloride, nylons, fluorocarbons, polyurethane prepolymer, polystyrene, high impact strength polystyrene, cellulosic resins, acrylics resins, polyphenylene oxide and polyphenylene sulfide, wherein the article has a shore A hardness of at least 70, and wherein the article comprises in the range of about 5 to about 85 weight percent thermoplastic, in the range of about 0 to about 20 weight percent reinforcing material and in the range of about 5 to about 95 weight percent ground tire waste.

16. The article of claim 11 the thermoplastic comprises at least one selected from the group consisting of polyolefins and high impact strength polystyrenes.

17. The article of claim 11 comprising in the range of about 15 to about 50 weight percent thermoplastic, in the range of about 2 to about 20 weight percent reinforcing material and in the range of about 50 to about 85 weight percent ground tire waste.

18. The article of claim 11 wherein the article has a shore A hardness of at least 80.

19. The article of claim 11 wherein the thermoplastic comprises at least one selected from the group consisting of polyolefins and high impact strength polystyrene, wherein the article has a shore A hardness of at least 80, and wherein the article comprises in the range of about 15 to about 50 weight percent thermoplastic, in the range of about 2 to about 20 weight percent reinforcing material and in the range of about 50 to about 85 weight percent ground tire waste.

20. The article of claim 11 wherein the thermoplastic comprises polyethylene or polypropylene, wherein the article has a shore A hardness of at least 90, and wherein the article comprises in the range of about 20 to about 40 weight percent thermoplastic, in the range of about 2 to about 20 weight percent reinforcing material and in the range of about 60 to about 80 weight percent ground tire waste.

* * * * *